United States Patent
Ito et al.

(10) Patent No.: US 12,504,425 B2
(45) Date of Patent: Dec. 23, 2025

(54) BLOOD VESSEL MODEL

(71) Applicants: FUJIFILM CORPORATION, Tokyo (JP); THE GENERAL HOSPITAL CORPORATION, Boston, MA (US)

(72) Inventors: Koju Ito, Kanagawa (JP); Chihaya Kakinuma, Kanagawa (JP); Daichi Hikimoto, Kanagawa (JP); Shinji Mima, Kanagawa (JP); Takafumi Suehiro, Kanagawa (JP); Craig M Neville, Boston, MA (US); Cathryn A Sundback, Boston, MA (US)

(73) Assignees: FUJIFILM CORPORATION, Tokyo (JP); THE GENERAL HOSPITAL CORPORATION

( * ) Notice: Subject to any disclaimer, the term of this patent is extended or adjusted under 35 U.S.C. 154(b) by 1498 days.

(21) Appl. No.: 16/705,216

(22) Filed: Dec. 5, 2019

(65) Prior Publication Data
US 2020/0110075 A1   Apr. 9, 2020

Related U.S. Application Data

(63) Continuation of application No. PCT/US2018/036364, filed on Jun. 7, 2018, which is
(Continued)

(51) Int. Cl.
*G01N 33/50* (2006.01)
*C12M 1/12* (2006.01)

(52) U.S. Cl.
CPC ..... *G01N 33/5088* (2013.01); *G01N 33/5064* (2013.01); *C12M 25/02* (2013.01)

(58) Field of Classification Search
CPC .......... G01N 33/5088; G01N 33/5064
See application file for complete search history.

(56) References Cited

U.S. PATENT DOCUMENTS 4,878,907 A   11/1989 Okada et al.
8,679,336 B2   3/2014 Hogno et al.
(Continued)

FOREIGN PATENT DOCUMENTS

CN   1869109 A   11/2006
CN   1926180 A   3/2007
(Continued)

OTHER PUBLICATIONS

Porosity. (1992). In C. G. Morris (Ed.), Academic Press Dictionary of Science and Technology (4th ed.). Elsevier Science & Technology. Credo Reference: https://search.credoreference.com/content/entry/apdst/porosity/0?institutionId=743 (Year: 1992).*
(Continued)

*Primary Examiner* — Sean C. Barron
(74) *Attorney, Agent, or Firm* — SOLARIS Intellectual Property Group, PLLC

(57) ABSTRACT

The present disclosure provides a blood vessel model including: a pair of channel members, mutually opposing each other, each of which includes an opposing face in which a respective microchannel is formed; and a porous membrane that includes plural through-holes penetrating in a thickness direction, that is disposed between the opposing faces of the pair of channel members, and that partitions between the microchannels, wherein the porous membrane is provided with a vascular endothelial cell layer so as to cover one face facing one of the microchannels, an average opening diameter of the through-holes is from 1 μm to 20 μm, and an opening coverage ratio of the through-holes is from 30% to 70%.

8 Claims, 8 Drawing Sheets

Related U.S. Application Data a continuation of application No. 15/618,151, filed on Jun. 9, 2017, now abandoned.

(60) Provisional application No. 62/640,589, filed on Mar. 9, 2018.

(56) References Cited

U.S. PATENT DOCUMENTS

| | | | |
|---|---|---|---|
| 2006/0154361 | A1 | 7/2006 | Wikswo et al. |
| 2006/0178480 | A1* | 8/2006 | Tada ................... B01D 69/02 264/41 |
| 2006/0266463 | A1 | 11/2006 | Washizu et al. |
| 2007/0154699 | A1 | 7/2007 | Hayashi et al. |
| 2007/0243574 | A1 | 10/2007 | Williams et al. |
| 2007/0281353 | A1 | 12/2007 | Vacanti et al. |
| 2009/0134553 | A1 | 5/2009 | Yamazaki et al. |
| 2010/0122957 | A1 | 5/2010 | Hongo et al. |
| 2010/0171231 | A1 | 7/2010 | Shimomura et al. |
| 2011/0053207 | A1 | 3/2011 | Hoganson et al. |
| 2011/0189475 | A1 | 8/2011 | Rizk et al. |
| 2011/0250585 | A1 | 10/2011 | Ingber et al. |
| 2016/0313306 | A1 | 10/2016 | Ingber et al. |
| 2017/0088807 | A1 | 3/2017 | Kim |

FOREIGN PATENT DOCUMENTS

| | | |
|---|---|---|
| CN | 101520960 A | 9/2009 |
| EP | 3635395 A2 | 4/2020 |
| JP | S63-119755 A | 5/1988 |
| JP | 2006-070254 A | 3/2006 |
| JP | 2007-291367 A | 11/2007 |
| JP | 2010-115624 A | 5/2010 |
| JP | 4734157 B2 | 7/2011 |
| JP | 2011-528232 A | 11/2011 |
| JP | 5415538 B2 | 2/2014 |
| JP | 2015-129871 A | 7/2015 |
| JP | 5815643 B2 | 11/2015 |
| JP | 2017-504320 A | 2/2017 |
| WO | 2009102751 A2 | 8/2009 |
| WO | 2017062845 A1 | 4/2017 |
| WO | 2018/226902 A2 | 12/2018 |

OTHER PUBLICATIONS

Office Action dated May 10, 2021, issued by the CIPO in corresponding Canadian Patent Application No. 3,066,616.
Office action dated Mar. 28, 2022 from the IPO in a Indian patent application No. 201947050671 corresponding to the instant patent application.
Kulig, Katherine M et al. "Biologic properties of surgical scaffold materials derived from dermal ECM", Biomaterials, Elsevier, Amsterdam, NL, vol. 34, No. 23, May 2, 2013, pp. 5776-5784, XP 28541470.
Extended European Search Report dated Jun. 26, 2020, issued in corresponding EP Patent Application No. 18813126.2.
Office Action dated Mar. 10, 2021, issued by the KIPO in corresponding Korean Patent Application No. 10-2019-7036088.
International Search Report issued in International Application No. PCT/US2018/036364 on Aug. 28, 2018.
Written Opinion of the ISA issued in International Application No. PCT/US2018/036364 on Aug. 28, 2018.
Sato K, et al. "Microfluidics for Nano-Pathophysiology" Adv Drug Deliv Rev Jul. 2014, vol. 74, pp. 115-121 (p. 1-30); figure 2a and figure 3; p. 17. second-third paragraphs.
English language translation of the following: Office action dated Jun. 30, 2021 from the SIPO in a Chinese patent application No. 201880037657.1 corresponding to the instant patent application. This office action translation is submitted now in order to supplement the understanding of the cited references which are being disclosed in the instant Information Disclosure Statement.
Sato, K. et al., "Microfluidics for nano-pathophysiology", Advanced Drug Delivery Reviews, vol. 74, pp. 115-121, 2014.
English language translation of the following: Office action dated Jan. 19, 2021 from the JPO in a Japanese patent application No. 2019-565825 corresponding to the instant patent application. This office action translation is submitted now in order to supplement the understanding of the cited references which are being disclosed in the instant Information Disclosure Statement.

* cited by examiner

EXAMPLE 3

COMPARATIVE EXAMPLE 3

EXAMPLE 3

COMPARATIVE EXAMPLE 3

BLOOD VESSEL MODEL

CROSS-REFERENCE TO RELATED APPLICATIONS

This application is a continuation application of International Application No. PCT/US2018/036364, filed on Jun. 7, 2018, which is incorporated herein by reference in its entirety. Further, this application claims priority from U.S. patent application Ser. No. 15/618,151, filed on Jun. 9, 2017, and U.S. Patent Application No. 62/640,589, filed on Mar. 9, 2018, the disclosures of which are incorporated by reference herein.

BACKGROUND

Technical Field

The present disclosure relates to a blood vessel model.

Related Art

Recently, there have been attempts to model internal organs such as blood vessels, intestines, livers, and lungs using devices including what are referred to as microchannels, which are channels with micrometer order widths. United States Patent Application Publication (U.S.) No. 2011/0053207, Japanese Patent Application Publication (JP-B) No. 5415538, and JP-B No. 5815643, for example, each discloses an internal organ model including a porous membrane having a layer of cells provided on a surface thereof, and at least two microchannels partitioned by the porous membrane.

Various experiments and tests can be performed using an internal organ model such as that disclosed in U.S. 2011/0053207, JP-B No. 5415538, and JP-B No. 5815643. For example, what is called an extravasation test may be performed by running blood containing a drug through one of the microchannels, and then measuring the number or amount of red blood cells, biomarker, or the like, which have moved through the porous membrane from the one microchannel to another microchannel. This extravasation test enables evaluation of the level of drug induced injury to the layer of cells provided to the surface of the porous membrane, enabling drug toxicology testing to be performed.

However, the pores in the porous membrane used in conventional internal organ models are produced using what is known as a track etching process, in which, for example, a material configuring the porous membrane is irradiated with heavy ions. Accordingly, the opening coverage ratio of pores in the membrane is, for example, as low as from 2% to 20%, and due to the membrane also being thick, the passage of red blood cells or the like is obstructed by the porous membrane. Namely, in the conventional internal organ models, there were cases in which the level of drug induced injury to a layer of cells provided at a surface of the porous membrane may not be accurately evaluated.

SUMMARY

The present disclosure provides a blood vessel model that may enable movement of red blood cells or the like to be suppressed from being obstructed by a porous membrane during an extravasation test.

A blood vessel model according to a first aspect of the present disclosure includes: a pair of channel members, mutually opposing each other, each of which includes an opposing face in which a respective microchannel is formed; and a porous membrane that includes plural through-holes penetrating in a thickness direction, that is disposed between the opposing faces of the pair of channel members, and that partitions between the microchannels, wherein the porous membrane is provided with a vascular endothelial cell layer so as to cover one face facing one of the microchannels, an average opening diameter of the through-holes is from 1 µm to 20 µm, and an opening coverage ratio of the through-holes is from 30% to 70%.

In the above configuration, the average opening diameter of the through-holes in the porous membrane partitioning between the microchannels is from 1 µm to 20 µm, and the opening coverage ratio of the through-holes is from 30% to 70%. Thus, during extravasation testing, when red blood cells or the like that are flowing through the through-holes in the porous membrane and moving from one of the microchannels to the other of the microchannels, the movement of the red blood cells or the like may be suppressed from being obstructed by the porous membrane.

In a second aspect of the present disclosure, in the first aspect, a membrane thickness of the porous membrane may be less than or equal to half of the average opening diameter of the through-holes.

In the above second aspect, since the membrane thickness of the porous membrane is less than or equal to half of the average opening diameter of the through-holes, compared to a case in which the membrane thickness of the porous membrane is greater than half the average opening diameter of the openings of the through-holes, red blood cells or the like may further readily pass through the through-holes in the porous membrane. Accordingly, the second aspect may further improve the accuracy of the extravasation test.

In a third aspect of the present disclosure, in the first or second aspect, communication holes that place the through-holes in communication with each other may be formed inside the porous membrane; the through-holes may be arranged in a honeycomb pattern; a variation coefficient of opening diameters of the through-holes may be less than or equal to 10%; and a porosity of the porous membrane may be greater than or equal to 50%.

In the above third aspect, the through-holes are arranged in a honeycomb pattern and are in communication with each other through the communication holes. The variation coefficient of the opening diameters of the openings of the through-holes is less than or equal to 10%, and the porosity of the porous membrane is greater than or equal to 50%. Thereby, in the third aspect, the red blood cells or the like may be made to pass through more uniformly. Accordingly, the third aspect may further improve the accuracy of the extravasation test.

In a fourth aspect of the present disclosure, in the first to the third aspects, a cell layer of cells may be selected from the group consisting of smooth muscle cells, mesenchymal stem cells, pericytes, and fibroblast cells, and may be provided at the other face of the porous membrane facing the other microchannel.

In the above fourth aspect, due to forming the cell layer of cells from the group consisting of smooth muscle cells, mesenchymal stem cells, pericytes, and fibroblast cells, on the other face of the porous membrane on the opposite side to the face on which the vascular endothelial cell layer is formed, a blood vessel model that more closely resembles an actual blood vessel may be achieved.

In a fifth aspect of the present disclosure, in the first aspect to the fourth aspect, a tensile elongation at break of the porous membrane may be greater than or equal to 50%; and a stress required for 10% elongation of the porous membrane may be less than or equal to 1000 gf/mm².

In the above fifth aspect, since the porous membrane is formed from a flexible material having a tensile elongation at break greater than or equal to 50% and having a stress required for 10% elongation less than or equal to 1000 gf/mm², a blood vessel model that more closely resembles an actual blood vessel may be achieved.

In a sixth aspect of the present disclosure, in the first aspect to the fifth aspect, the through-holes may have flattened shapes in plan view and may include a major axis and a minor axis.

In the above sixth aspect, since the through-holes have flattened shapes such as elliptical shapes in plan view, the red blood cells or the like may pass more readily through the through-holes. Accordingly, the sixth aspect may further improve accuracy of the extravasation test.

In a seventh aspect of the present disclosure, in the first aspect to the sixth aspect, the porous membrane may include a porous region in which the through-holes are formed, and a non-porous region in which the through-holes are not formed.

In the above seventh aspect, since, for example, portions of the porous membrane disposed in the vicinity of inlets and in the vicinity of outlets of the microchannels are configured as the non-porous regions in which the through-holes are not formed, the flow of red blood cells or the like inside the microchannels may be regulated. Accordingly, the seventh aspect may further improve accuracy of the extravasation test.

According to the above aspects, the present disclosure may enable the movement of red blood cells or the like during extravasation testing to be suppressed from being obstructed by the porous membrane.

BRIEF DESCRIPTION OF THE DRAWINGS

Exemplary embodiments of the present invention will be described in detail based on the following figures, wherein.

DETAILED DESCRIPTION

Figure 1:
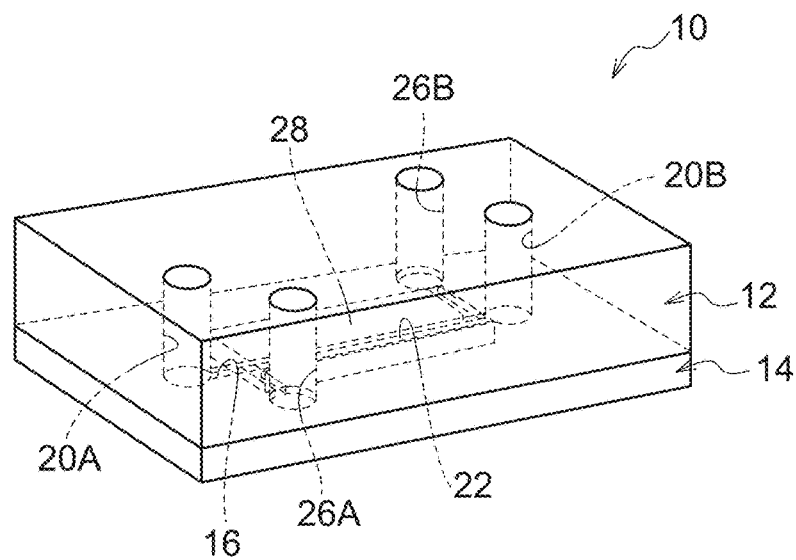
FIG. 1 is a perspective diagram illustrating an overall configuration of a blood vessel model of an exemplary embodiment.

Explanation follows regarding an example and modified examples of an exemplary embodiment of the present disclosure, with reference to FIG. 1 to FIG. 6. Note that the following exemplary embodiment is merely an example of the present disclosure, and does not limit the scope of the present disclosure. Also note that the dimensions of various configuration in the drawings are modified as appropriate in order to facilitate explanation of the various configuration. Accordingly, the scale in the drawings may differ from the scale in actual practice.

Figure 2:
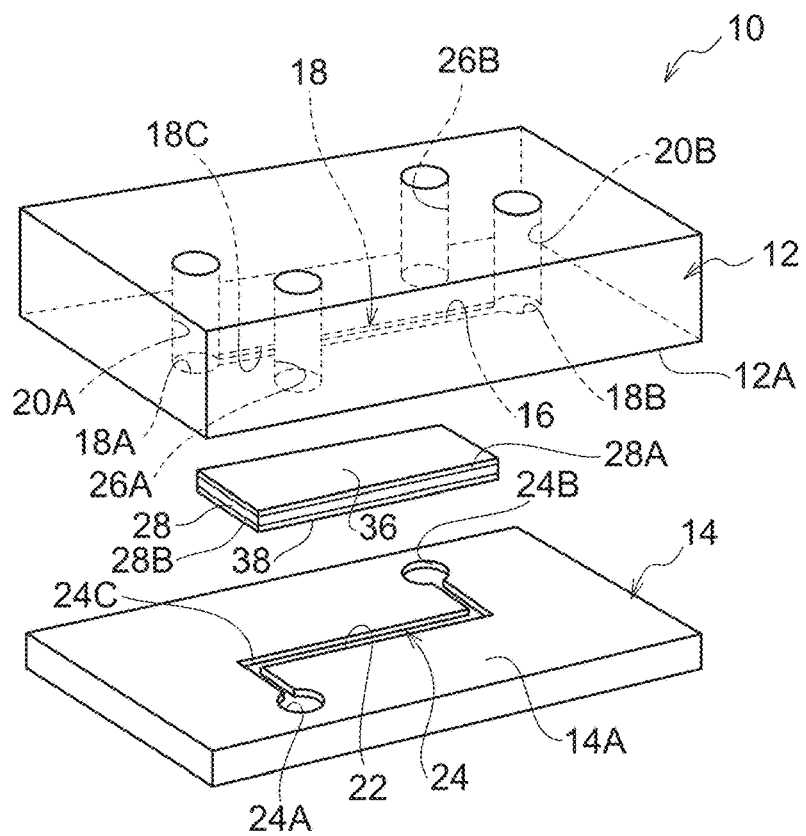
FIG. 2 is an exploded perspective diagram illustrating overall configuration of a blood vessel model of an exemplary embodiment.

As illustrated in FIG. 1 and FIG. 2, a blood vessel model 10 of an exemplary embodiment includes an upper channel member 12 and a lower channel member 14 stacked on one another. The upper channel member 12 and the lower channel member 14 are, for example, configured from an elastic material such as polydimethylsiloxane (PDMS), and have substantially rectangular plate shapes.

Note that, besides PDMS, other examples of the material configuring the upper channel member 12 and the lower channel member 14 include cyclic olefin polymer (COP), epoxy resin, urethane resin, styrene-based thermoplastic elastomer, olefin-based thermoplastic elastomer, acrylic-based thermoplastic elastomer, polyvinyl alcohol and the like.

A concave portion 18, that defines an upper microchannel 16, is formed in a lower face of the upper channel member 12, namely, at an opposing face 12A opposing to the lower channel member 14. The concave portion 18 includes an inlet 18A, an outlet 18B, and a channel portion 18C communicating the inlet 18A with the outlet 18B.

Through-holes 20A and 20B are formed in the upper channel member 12, penetrate the upper channel member 12 in the thickness direction, and have lower ends in respective communication with the inlet 18A and the outlet 18B. Upper ends of the through-holes 20A and 20B open at an upper face of the upper channel member 12. Liquid supply tubing (not illustrated) is connected to the upper ends of the through-holes 20A and 20B.

Similarly, a concave portion 24 that defines a lower microchannel 22 is formed in an upper face of the lower channel member 14, namely, at an opposing face 14A opposing to the upper channel member 12. The concave portion 24 includes an inlet 24A, an outlet 24B, and a channel portion 24C communicating the inlet 24A with the outlet 24B.

The inlet 24A and outlet 24B of the lower channel member 14 and the inlet 18A and outlet 18B of the upper channel member 12 are provided at positions not overlapping in plan view. In contrast thereto, the channel portion 24C of the lower channel member 14 and the channel portion 18C of the upper channel member 12 are provided at positions overlapping in plan view.

Through-holes 26A and 26B are also formed in the upper channel member 12, penetrate the upper channel member 12 in the thickness direction, and have lower ends in respective communication with the inlet 24A and the outlet 24B. Upper ends of the through-holes 26A and 26B open at the upper face of the upper channel member 12. Liquid supply tubing (not illustrated) is connected to the upper ends of the through-holes 26A and 26B.

A porous membrane 28 is provided between the opposing faces 12A and 14A of the upper channel member 12 and the lower channel member 14. The upper channel member 12 and the lower channel member 14 are joined together with the porous membrane 28 in an interposed state therebetween. Note that, besides being bonded together using an adhesive agent, a variety of methods, such as welding, attraction (self-adhering), or joining with bolts, may be employed as the method for joining the upper channel member 12 and the lower channel member 14 together.

The porous membrane 28 is, for example, a hydrophobic polymer that solves in a hydrophobic organic solvent. Note that the hydrophobic organic solvent is a liquid with a solubility in 25° C. water of less than or equal to 10 (g/100 g water).

Examples of hydrophobic polymers include polymers such as polybutadiene, polystyrene, polycarbonate, polyesters (for example, polylactic acid, polycaprolactone, polyglycolic acid, polylactic acid-polyglycolic acid copolymer, polylactic acid-polycaprolactone copolymer, polyethylene terephthalate, polyethylene naphthalate, polyethylene succinate, polybutylene succinate, and poly-3-hydroxybutyrate), polyacrylate, polymethacrylate, polyacrylamide, polymethacrylamide, polyvinyl chloride, polyvinylidene chloride, polyvinylidene fluoride, polyhexafluoropropene, polyvinyl ether, polyvinylcarbazole, polyvinyl acetate, polytetrafluoroethylene, polylactone, polyamide, polyimide, polyurethane, polyurea, polyaromatics, polysulfone, polyethersulfone, polysiloxane derivatives, and cellulose acylate (for example, triacethyl cellulose, cellulose acetate propionate, and cellulose acetate butyrate). Polymers that dissolve in a hydrophobic organic solvent are preferable from the viewpoint of producing a honeycomb membrane using the production method disclosed, for example, in JP-B No. 4,734,157.

These polymers may have the form of a homopolymer, a copolymer, a polymer blend or a polymer alloy, as necessary, from the viewpoints of, for example, solubility in solvents, optical properties, electrical properties, membrane strength, and elasticity. These polymers may be used singly, or in combination of two or more thereof. Note that the material of the porous membrane 28 is not limited to being a hydrophobic polymer, and various materials may be selected from viewpoints such as the adhesiveness of cells.

An upper face 28A and a lower face 28B of the porous membrane 28 (hereinafter, the upper face 28A and the lower face 28B are may be referred collectively as "main faces") are sized so as to substantially cover the channel portions 18C and 24C of the upper microchannel 16 and the lower microchannel 22, such that the upper microchannel 16 is partitioned from the lower microchannel 22.

Specifically, the upper face 28A of the porous membrane 28, namely, the main face facing the upper channel member 12, together with the concave portion 18 of the upper channel member 12, defines the upper microchannel 16. The lower face 28B of the porous membrane 28, namely, the main face facing the lower channel member 14, together with the concave portion 24 of the lower channel member 14, defines the lower microchannel 22.

Figure 3:
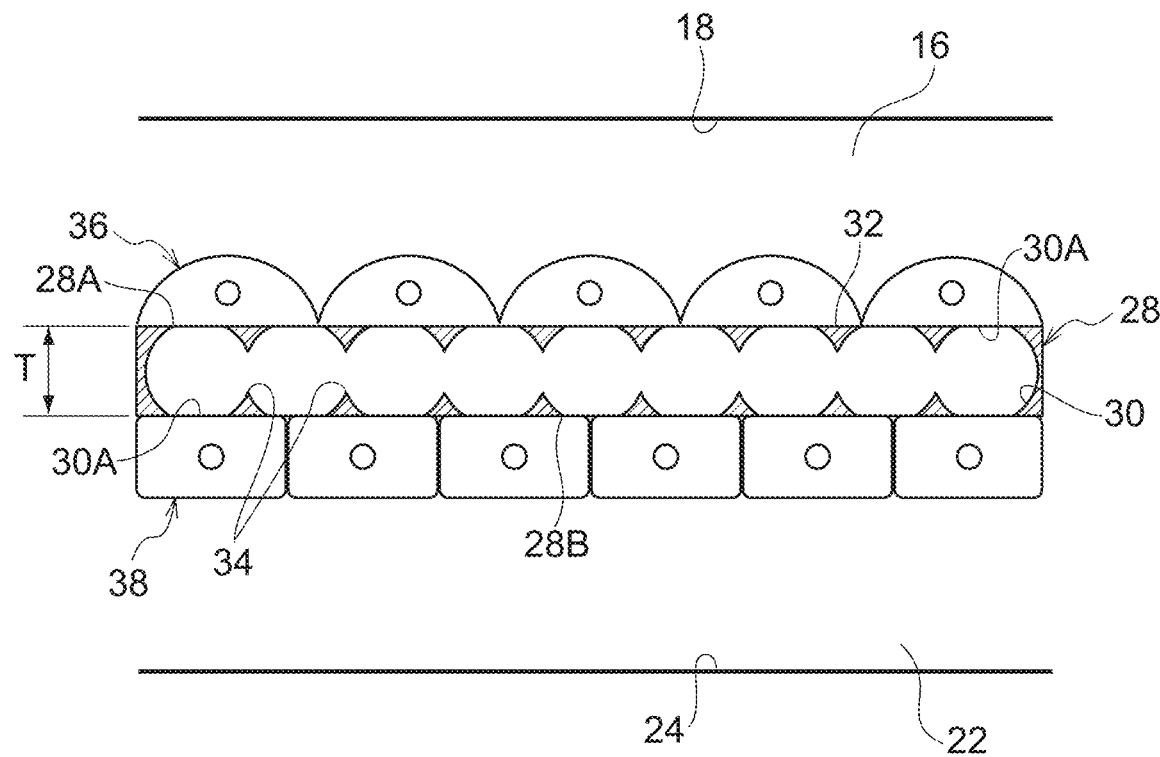
FIG. 3 is an enlarged cross-section illustrating a porous membrane of a blood vessel model of an exemplary embodiment.

As illustrated in FIG. 3, a vascular endothelial cell layer 36, for example, is provided to the upper face 28A of the porous membrane 28 so as to completely cover the upper face 28A. The inside of the upper microchannel 16 thereby configures an environment that closely resembles the inside of a blood vessel. Examples of vascular endothelial cells include: vascular endothelial cells originating from the umbilical vein, the umbilical artery, the aorta, a coronary artery, the pulmonary artery, a pulmonary microvessel, or a dermal microvascular; and vascular endothelial cells differentiated from pluripotent stem cells.

A cell layer 38, for example, configured from cells selected from the group consisting of smooth muscle cells, mesenchymal stem cells, pericytes, and fibroblast cells, is provided to the lower face 28B of the porous membrane 28 so as to completely cover the lower face 28B. The lower microchannel 22 thereby configures an environment that closely resembles a blood vessel exterior. Mesenchymal stem cells (MSC) are somatic stem cells that are capable of dividing into muscle cells, fat cells, cartilage cells, and the like.

Note that the cell layer 38 of cells selected from the group consisting of smooth muscle cells, mesenchymal stem cells, pericytes, and fibroblast cells may be provided to the upper face 28A of the porous membrane 28, and the vascular endothelial cell layer 36 may be provided to the lower face 28B of the porous membrane 28. Moreover, it is sufficient that the vascular endothelial cell layer 36 be provided to at least one of the main faces of the porous membrane 28. Configuration may be such that the cell layer 38 is not provided to the other main face of the porous membrane 28.

From the viewpoint of adhesiveness of cells, it is preferable that a region where cells are seeded on at least one of the upper face 28A and the lower face 28B of the porous membrane 28 is coated by at least one selected from the group consisting of fibronectin, collagen (for example, type I collagen, type IV collagen or type V collagen), laminin, vitronectin, gelatin, perlecan, nidogen, proteoglycan, osteopontin, tenascin, nephronectin, a basement membrane matrix and polylysine. Note that it is preferable that the porous membrane 28, and the inside of through-holes 30, described later, be coated by at least one of these.

For providing the vascular endothelial cell layer 36 and the cell layer 38 to the respective main face of the porous membrane 28, for example, a method in which a cell suspension is poured into the upper microchannel 16 and the lower microchannel 22 so as to seed cells on the main faces of the porous membrane 28, may be employed. Further, a method in which cells are seeded and cultured on the main faces of the porous membrane 28 inside a separate culturing apparatus, and then the porous membrane 28 having the vascular endothelial cell layer 36 and the cell layer 38 formed thereon is mounted in the blood vessel model 10, may also be employed.

Figure 4:
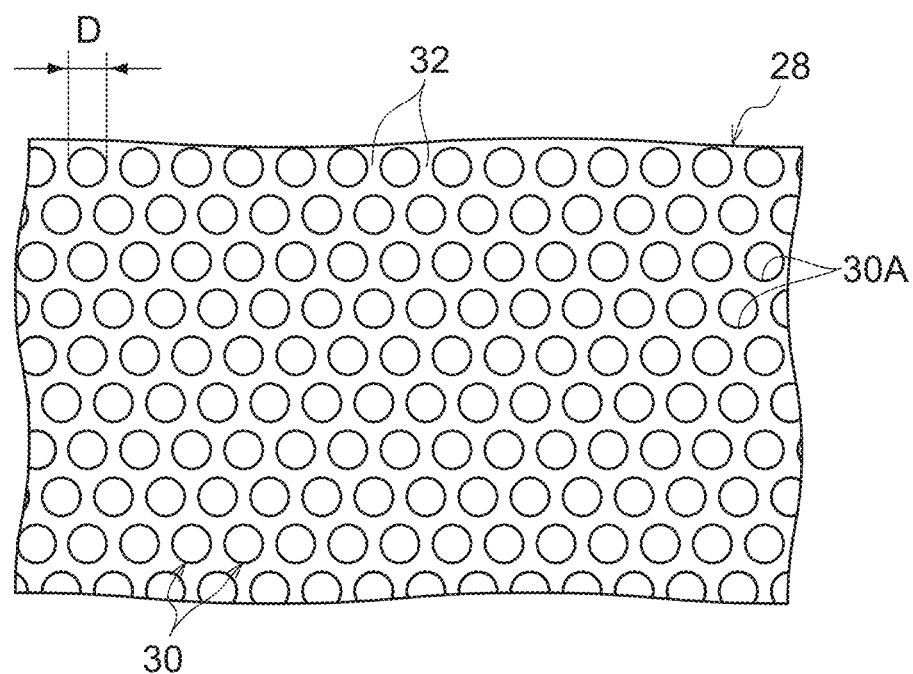
FIG. 4 is a plan view illustrating a porous membrane of a blood vessel model of an exemplary embodiment.

As illustrated in FIG. 3 and FIG. 4, plural through-holes 30 are formed in the porous membrane 28 penetrating the porous membrane 28 in the thickness direction. Openings 30A of the through-holes 30 are provided in each of the upper face 28A and the lower face 28B of the porous membrane 28. As illustrated in FIG. 4, the openings 30A have circular shapes in plan view. The openings 30A are provided at a separation from each other. A flat portion 32 extends between adjacent openings 30A. Note that the openings 30A are not limited to circular shapes, and may also be configured with polygonal shapes.

The plural openings 30A are arranged in a regular manner, and in the present exemplary embodiment, as illustrated in FIG. 4, for example, are arranged in honeycomb pattern. A honeycomb pattern arrangement is an arrangement in which the centers of the openings 30A are disposed at positions of the vertexes, and at the points where diagonals intersect, for units of a parallel hexagon (a regular hexagon is preferable) or a shape close to this. Herein, "centers of the openings" means the centers of the openings 30A in plan view.

Note that the arrangement of the openings 30A is not limited to a honeycomb pattern. The openings 30A may also be configured in a lattice pattern or a face-centered lattice pattern. A lattice pattern arrangement is an arrangement in which the centers of the openings are disposed at the positions of the vertexes for units of a parallelogram (it goes without saying that this includes squares, rectangles, and rhombuses; a square is preferable) or a shape close thereto. A face-centered lattice pattern arrangement is an arrangement in which the centers of the openings are disposed at the positions of the vertexes, and at the points where diagonals intersect, for units of a parallelogram (it goes without saying that this includes squares, rectangles, and rhombuses; a square is preferable) or a shape close thereto.

The arrangement of the openings 30A may be arbitrary. However, it is preferable that the plural openings 30A are arranged in a regular manner from the viewpoint of achieving a uniform density of the openings 30A in the upper face 28A and the lower face 28B of the porous membrane 28. A regular arrangement is an arrangement in which the variation coefficient of the surface areas of the parallel hexagon or parallelogram units of the arrangement is, for example, less than or equal to 10%. Some of the openings 30A may be missing or the openings 30A may be not in alignment. However, it is preferable that the openings 30A are continuously arranged in all directions without any gaps therebetween. Note that the "variation coefficient" is a value arrived at by dividing the standard deviation of a given population by the mean thereof, and is an index expressing the degree of dispersion in the population as a percentage.

As illustrated in FIG. 3, each through-hole 30 in the porous membrane 28 has a spherical segment shape, which is a shape in which the upper and lower end of a sphere have been cut away. Through-holes 30 that are adjacent to one another are in communication with each other through respective communication holes 34 in the interior of the porous membrane 28.

It is preferable that each through-hole 30 is in communication with every adjacent through-hole 30. In cases in which the openings 30A of the plural through-holes 30 are arranged in a honeycomb pattern, as in the present exemplary embodiment, each through-hole 30 is in respective communication with six adjacent through-holes 30 through six communication holes 34. Note that the through-holes 30 may have a barrel shape, a circular column shape, a polygonal column shape, or the like, and the communication holes 34 may be tube shaped voids linking together adjacent through-holes 30.

An opening diameter D of each opening 30A of the through-holes 30 is, for example, a size such that red blood cells in blood are able to pass therethrough. Specifically, the average opening diameter is preferably from 1 μm to 20 μm, and even more preferably is from 3 μm to 10 μm. Setting the average opening diameter to 1 μm or greater enables the through-holes 30 to be a size that allows red blood cells to pass therethrough, and setting the average opening diameter to 20 μm or less enables retention of the vascular endothelial cell layer 36 and the cell layer 38 on the main faces of the porous membrane 28.

Herein, "opening diameter D" is the major axis of the openings 30A, and "average opening diameter" is the calculated average of the opening diameters D measured for ten or more arbitrarily selected openings 30A. "Major axis" means the longest distance between two arbitrarily selected points on the outline of an opening. However, in cases in which a direction has been specified, "major axis" means the longest distance between two arbitrarily selected points along that direction.

The opening coverage ratio of the openings 30A of the through-holes 30 is preferably from 30% to 70%, and even more preferably is from 40% to 60%. Setting the opening coverage ratio to greater than or equal to 30% enables the movement of red blood cell to be suppressed from being obstructed by the porous membrane 28, and setting the opening coverage ratio to less than or equal to 70% enables the required strength to be achieved in the porous membrane 28.

Herein, "opening coverage ratio" expresses a ratio of S2 to S1 as a percentage, wherein S1 denotes a unit of surface area of the porous membrane 28 under the supposition that the main faces of the porous membrane 28 are smooth (namely, under the supposition that there are no openings 30A in the porous membrane 28), and S2 denotes the sum of the surface area of openings 30A provided per unit surface area, where the same units of measurement are used for S1 and S2.

The membrane thickness T of the porous membrane 28 is preferably less than or equal to half of the average opening diameter of the openings 30A of the through-holes 30. Specifically, the thickness T is preferably from 0.5 μm to 10 μm, and is more preferably from 1 μm to 10 μm. Setting the membrane thickness T of the porous membrane 28 to a thickness less than or equal to half of the average opening diameter of the through-holes 30 enables the movement of red blood cell to be suppressed from being obstructed by the porous membrane 28.

Further, since the porous membrane 28 is a scaffold upon which cells adhere and grow, cell-cell interaction between the cells on one face of the porous membrane 28 and the cells on the other face of the porous membrane 28, namely, at least one of information transmission via humoral factors or cell-cell contact, becomes more active the greater the opening coverage ratio on the porous membrane 28 and the thinner the membrane thickness of the porous membrane 28. The more active cell-cell interaction is during cell cultivation to provide the vascular endothelial cell layer 36 and the cell layer 38 on the main faces of the porous membrane 28, the better a blood vessel model can be produced with functionality resembling that of in vivo tissue.

The variation coefficient of the opening diameters D of the openings 30A is preferably less than or equal to 10%, and the smaller the variation coefficient the more preferable. The smaller the variation coefficient of the opening diameters D, the more uniformly red blood cells and the like can pass through the plural through-holes 30 in the porous membrane 28.

The porosity of the porous membrane 28 is preferably greater than or equal to 50%. Setting the porosity to greater than or equal to 50% enables the movement of red blood cell to be suppressed from being obstructed by the porous membrane 28. Note that if the porosity is too large, the strength of the porous membrane 28 becomes insufficient with regards to the required strength therefor, and so the porosity is preferably less than or equal to 95%.

Herein, "porosity" expresses a ratio of V2 to V1 as a percentage, wherein V1 denotes a unit of volume of the porous membrane 28 under the supposition that the main faces of the porous membrane 28 are smooth (namely, under the supposition that there are no openings 30A in the porous membrane 28), and V2 denotes the sum of the volume of the through-holes 30 and the communication holes 34 provided per unit volume, where the same units of measurement are used for V1 and V2.

The tensile elongation at break of the porous membrane 28 is preferably greater than or equal to 50%, is more preferably 100%, and is even more preferably greater than or equal to 200%. The stress required for 10% elongation of the porous membrane 28 is preferably less than or equal to 1000 gf/mm$^2$. A material becomes more flexible as the tensile elongation at break increases and the stress required for 10% elongation decreases. It is thus possible to bend, stretch, and compress the porous membrane 28, enabling the blood vessel model 10 to more closely resemble an actual blood vessel.

Herein, the "tensile elongation at break" can be evaluated by measuring the elongation at tensile breaking of the porous membrane 28 according to the method defined in JIS K 6251:2010. The "stress required for 10% elongation" can be evaluated by measuring the stress applied to the porous membrane 28 when the porous membrane 28 is elongated by 10% according to the method defined in JIS K 6251:2010.

Note that, examples of methods for producing the porous membrane 28 formed with the through-holes 30 include, nano-printing processes, condensation processes, etching processes, sandblasting processes, or press molding processes. A nano-printing process is a method in which the through-holes 30 are produced by pouring a material for configuring the porous membrane 28 into a mold having projections and recesses, or pressing such a mold against a material for configuring the porous membrane 28. A condensation process is a method in which condensation is induced on the surface of a material for configuring the porous membrane 28, so as to form the through-holes 30 by using water droplets as molds.

In comparison to other methods, a condensation process enables the membrane thickness of the porous membrane 28 to be made thinner, enables the porosity and the opening coverage ratio of the openings 30A to be increased, and also enables the communication holes 34 to be provided within the porous membrane 28. Thus, in the present exemplary embodiment, the porous membrane 28 is produced using a condensation process. Condensation processes are described in detail in, for example, JP-B No. 4945281, JP-B No. 5422230, JP-B No. 5405374, and Japanese Patent Application Laid-Open (JP-A) No. 2011-74140.

Next, as an example, explanation is given regarding a case in which a drug toxicology evaluation is performed using the blood vessel model 10 of the present exemplary embodiment. When performing a drug toxicology test, first, the upper channel member 12 and the lower channel member 14 are joined together with the porous membrane 28 in an interposed state therebetween to produce the blood vessel model 10 including the upper microchannel 16 and the lower microchannel 22, as illustrated in FIG. 2. Note that the vascular endothelial cell layer 36 and the cell layer 38 are provided to the main faces of the porous membrane 28.

Then, using a pump, a blood dilution containing a drug is run through tubing (not illustrated in the drawings) and the through-hole 20A into the upper microchannel 16, is passed through the inside of the upper microchannel 16, and is caused to pass through the through-hole 20B and tubing (not illustrated in the drawings) to run out of the blood vessel model 10.

Meanwhile, using a pump, a culture solution or a physiological saline solution is run through tubing (not illustrated in the drawings) and the through-hole 26A into the lower microchannel 22, is passed through the inside of the lower microchannel 22, and is caused to pass through the through-hole 26B and tubing (not illustrated in the drawings) to run out of the blood vessel model 10. Note that the pressure in the upper microchannel 16 through which the blood dilution flows is higher than that in the lower microchannel 22 through which the culture solution or the physiological saline solution flows.

At the start of the toxicology test, as illustrated in FIG. 3, the whole of the upper face 28A and the whole of the lower face 28B of the porous membrane 28 are respectively covered by the vascular endothelial cell layer 36 and the cell layer 38. Accordingly, red blood cells in the blood are unable to pass through the porous membrane 28 and do not leak out into the lower microchannel 22.

However, when a certain amount of time has elapsed from the start of the toxicology test, the vascular endothelial cell layer 36 is injured by the toxicity of the drug. In addition to the vascular endothelial cell layer 36, the cell layer 38 is also injured by the drug. By measuring the number of red blood cells that have passed through the porous membrane 28 and flowed into the lower microchannel 22 due to such an injured portion, namely, by performing an extravasation test, it is possible to evaluate the level of drug induced injury to the vascular endothelial cell layer 36 and the cell layer 38.

Further, when the vascular endothelial cell layer 36 is injured by the toxicity of the drug, the state of the cells configuring the cell layer 38 changes due to cell-cell interaction between the vascular endothelial cell layer 36 and the cell layer 38, and as a result, a gap may be formed in the cell layer 38. By measuring the number of red blood cells that have passed through the gap and flowed into the lower microchannel 22, namely, by performing an extravasation test, it is possible to evaluate the level of drug induced injury to the vascular endothelial cell layer 36 and the level of response of the cell layer 38.

Note that as cell-cell interaction between the vascular endothelial cell layer 36 and the cell layer 38 becomes more active, the greater the opening coverage ratio on the porous membrane 28 and the thinner the membrane thickness of the porous membrane 28, this test is able to be performed with high sensitivity.

Further, in the above toxicology test, a drug and a solution containing a tracer may be run through the upper microchannel 16 in place of the blood dilution. Examples of the tracer include fluorescently-labeled chemical substances, radioisotope-containing chemical substances, dye compounds, and the like, and more specifically, at least one selected from the group consisting of dextran, Evans blue, fluorescein sodium, and FITC microbeads. Note that fluorescent dye is preferably red, with an excitation wavelength/fluorescence wavelength of 580 nm/605 nm.

The level of drug induced injury to the vascular endothelial cell layer 36 and the cell layer 38 can be evaluated by measuring fluorescent intensity, radiation, or chromaticity in accordance with the type of tracer so as to quantify the tracer, and measuring the amount of tracer that has passed through the porous membrane 28 and flowed into the lower microchannel 22 from the upper microchannel 16.

The present exemplary embodiment is configured such that in the porous membrane 28 partitioning the upper microchannel 16 from the lower microchannel 22, the average opening diameter of the openings 30A of the through-holes 30 is from 1 μm to 20 μm, and the opening coverage ratio of the openings 30A of the through-holes 30 is from 30% to 70%. Accordingly, during extravasation testing when red blood cells running through the upper microchannel 16 pass through the through-holes 30 in the porous membrane 28 and move into the lower microchannel 22, the movement of red blood cells can be suppressed from being obstructed by the porous membrane 28.

Moreover, the present exemplary embodiment is configured such that the membrane thickness of the porous membrane 28 is less than or equal to half of the average opening diameter of the openings 30A of the through-holes 30. Accordingly, compared to a case in which the membrane thickness of the porous membrane 28 is greater than half the average opening diameter of the openings 30A of the through-holes 30, red blood cells more readily pass through the through-holes 30 in the porous membrane 28. Accordingly, the present exemplary embodiment may further improve the accuracy of the extravasation test.

Additionally, the present exemplary embodiment is configured with the openings 30A of the through-holes 30 arranged in a honeycomb pattern, and through-holes 30 within the porous membrane 28 are in communication with each other through the communication holes 34. The variation coefficient of the opening diameters of the openings 30A of the through-holes 30 is less than or equal to 10%, and the porosity of the porous membrane 28 is greater than or equal to 50%. Accordingly, red blood cells can pass through the plural through-holes 30 in the porous membrane 28 more uniformly. Accordingly, the present exemplary embodiment may further improve the accuracy of the extravasation test.

Additionally, the present exemplary embodiment is configured with the vascular endothelial cell layer 36 provided to the upper face 28A of the porous membrane 28, and with the cell layer 38 provided to the lower face 28B of the porous membrane 28. The cell layer 38 is configured of cells selected from the group consisting of smooth muscle cells, mesenchymal stem cells, pericytes, and fibroblast cells. Additionally, the porous membrane 28 is configured from a flexible material having a tensile elongation at break that is greater than or equal to 50%, and in which the stress required for 10% elongation is less than or equal to 1000 gf/mm$^2$. Thereby, in the present exemplary embodiment, the blood vessel model 10 may be configured to more closely resemble an actual blood vessel.

Explanation has been given regarding an example of an exemplary embodiment of the present disclosure. However, the present disclosure is not limited to the above, and various modifications may be implemented besides the above, within a range not departing from the spirit of the present disclosure.

Figure 5:
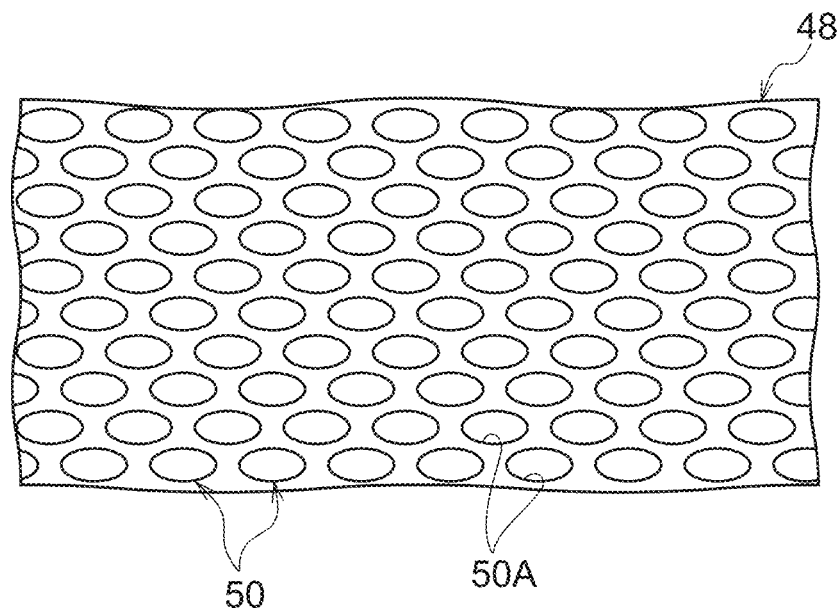
FIG. 5 is a plan view illustrating a porous membrane of a blood vessel model of a modified example.

For example, although the openings 30A of the through-holes 30 in the porous membrane 28 of the above exemplary embodiment have circular shapes in plan view, openings 50A of through-holes 50 in a porous membrane 48 may have elliptical shapes in plan view, as illustrated in FIG. 5. By configuring the openings 50A of the through-holes 50 with elliptical shapes, for example, disc-shaped red blood cells may be easily passed through the openings 50A of the through-holes 50, and other cells in blood may be less liable to pass therethrough.

Examples of methods for forming the openings 50A of through-holes 50 into elliptical shapes include a method in which, after circular shaped openings 30A such as illustrated in FIG. 4 have been formed in the porous membrane 48, the porous membrane 48 is stretched along one direction (the left-right direction in FIG. 4). This method enables plural elliptical shaped openings 50A to be formed having their major axis directions along the same direction (the left-right direction in FIG. 5).

Note that elliptical shaped openings 50A may be directly formed in the porous membrane 48 using press molding or the like, without stretching the porous membrane 48. Moreover, so long as the shape of the openings 50A is a flattened shape with a major axis and a minor axis in plan view, the shape of the openings 50A may, for example, be a flattened polygonal shape arrived at by stretching a regular polygon.

Figure 6:
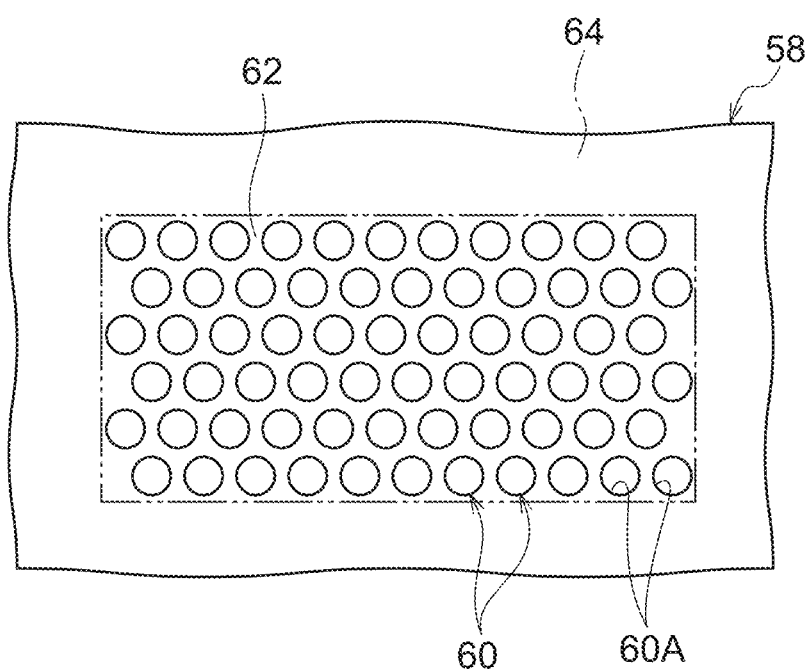
FIG. 6 is a plan view illustrating a porous membrane of a blood vessel model of a modified example.

In the porous membrane 28 of the above exemplary embodiment, the openings 30A of the through-holes 30 were arranged in a regular manner over the entirety of the main faces of the porous membrane 28. However, as illustrated in FIG. 6, a porous membrane 58 may be provided with a porous region 62 in which openings 60A of through-holes 60 are formed, and a non-porous region 64 not formed with the openings 60A of through-holes 60 (the region marked by the double-dotted dashed line in FIG. 6).

Specifically, in the porous membrane 58, portions disposed in the vicinity of the inlet 18A and in the vicinity of the outlet 18B of the concave portion 18 configuring the upper microchannel 16 illustrated in FIG. 1, and in the vicinity of the inlet 24A and in the vicinity of the outlet 24B of the concave portion 24 configuring the lower microchannel 22 illustrated in FIG. 1, are, for example, configured as the non-porous region 64.

Generally, the flow of liquid such as blood is easily disturbed at the inlets 18A and 24A and at the outlets 18B and 24B. Thus, by configuring the porous membrane 58 in the vicinity of the inlets 18A and 24A and in the vicinity of the outlets 18B and 24B as the non-porous region 64, the flow of liquid such as blood in the upper microchannel 16 and in the lower microchannel 22 may be regulated. Accordingly, the porous membrane 58 may further improve the accuracy of the extravasation test.

The blood vessel model of the present disclosure may enable extravasation testing to be performed, in a state in which movement of leaking substances such as red blood cells to outside the blood vessel accompanying drug toxicity is suppressed from being obstructed by the porous membrane. The blood vessel model of the present disclosure may therefore be useful as a blood vessel model capable of toxicology testing with high-accuracy.

Detailed explanation follows regarding examples of the exemplary embodiments of the present disclosure. Note that the exemplary embodiments of the present disclosure are not to be interpreted as being limited by the examples illustrated below.

Figure 7A:
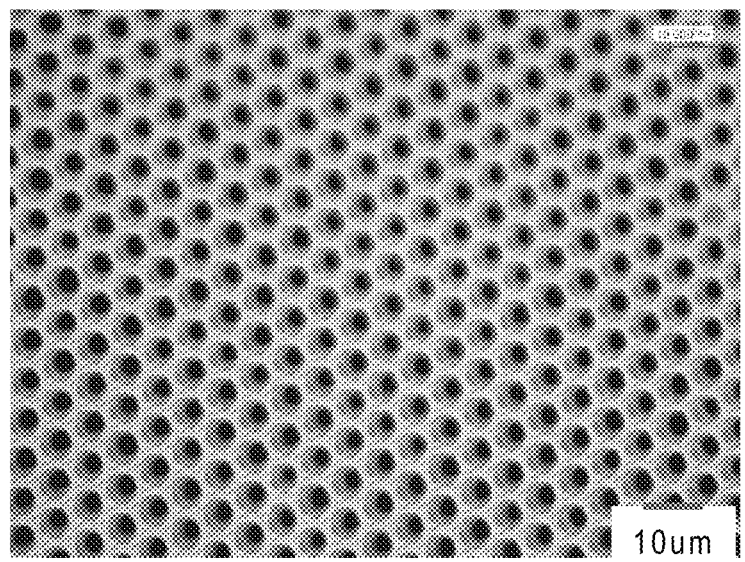
FIG. 7A is a micrograph of a porous membrane of an example 1.

FIG. 7A illustrates a micrograph of a porous membrane of example 1. In example 1, a porous membrane formed of polycarbonate, similar to the porous membrane 28 of the above exemplary embodiment, was employed in which the openings of plural through-holes were arranged in a honeycomb pattern and the through-holes were in communication through communication holes. Note that the average opening diameter of openings in the porous membrane of example 1 was 5 μm, the opening coverage ratio of the openings was 55%, the membrane thickness of the porous membrane was 2.2 μm, the variation coefficient of the opening diameters of the openings was 3.5%, the porosity of the porous membrane was 75%, the tensile elongation at break was 250%, and the stress required for 10% elongation was 100 gf/mm2.

The microstructure of the produced porous membrane was measured using a profile scanning laser microscope (product name VK-X100, made by Keyence, Japan). Observations were made using a magnification at which 50 or more openings appeared on a single screen. Based on the observed micrograph, image analysis was performed on the openings present on the one screen, so as to measure the respective opening diameters D and find the average opening diameter DAV and the variation coefficient σD of the opening diameters D. Note that the variation coefficient of the opening diameters (given as a percentage) can be achieved using the calculation (σD/DAV)×100.

The average opening diameter and the opening coverage ratio were achieved by performing binarization processing and image processing on the micrograph, using the 2D image analysis software WinROOF (Mitani Corp.). The membrane thickness of the porous membrane is an average value of the thickness of opening portions measured at ten points using the profile scanning laser microscope.

Cross-sections of the porous membrane were observed using a scanning electron microscope (SEM, product name SU8030, made by Hitachi, Japan) and the diameters of spheres equivalent to the through-holes was calculated as the porosity of the porous membrane. The porous membrane sample to be evaluated was sliced by a microtome (product name FCS, made by Reichert, Austria) to produce a sample for cross-sectional observation, the surface of the sample for cross-sectional observation was coated with an Os layer at a thickness of 6 nm, and the sample was observed with a SEM using an accelerating voltage of 2 kV. The tensile elongation at break of the porous membrane and the stress required for 10% elongation thereof were measured using a FUDOH RHEO METER RT-2002D•D (made by Rheotech Corp.).

Figure 7B:
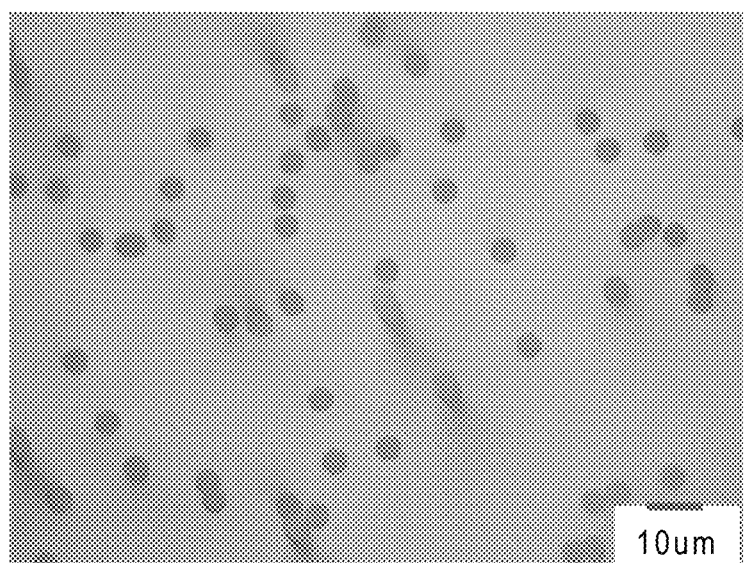
FIG. 7B is a micrograph of a porous membrane of a comparative example 1.

FIG. 7B illustrates a micrograph of a porous membrane of comparative example 1. In comparative example 1, a porous membrane of conventional technology formed of polycarbonate was employed in which the openings were formed by a track etching process. Note that the average opening diameter of the openings in the porous membrane of comparative example 1 was 5.7 μm, the opening coverage ratio of the openings was 12.4%, the membrane thickness of the porous membrane was 10.6 μm, the variation coefficient of the opening diameters of the openings was 35%, the porosity of the porous membrane was 15%, the tensile elongation at break was 150%, and the stress required for 10% elongation was 5800 gf/mm$^2$.

A porous membrane is prepared with medical paper affixed to both sides thereof. The medical paper on one face of the porous membrane is removed using tweezers, and the face from which the medical paper has been removed is set face down on a lower channel member. The porous membrane is then soaked in ethanol using a swab to join the porous membrane and the lower channel member together.

Next, the medical paper on the other face of the porous membrane is removed using tweezers, and the upper channel member is stacked on the other face of the porous membrane. The positions of the upper channel member and the lower channel member are aligned while being checked on a microscope, and the upper channel member and the lower channel member are joined together. Thereby, the blood vessel model of example 1 and the blood vessel model of the comparative example 1 were respectively produced.

Note that in example 1 and comparative example 1, in order to evaluate the permeability of the porous membranes to red blood cells, the porous membranes employed did not have a vascular endothelial cell layer 36 nor a cell layer of cells selected from the group consisting of smooth muscle cells, mesenchymal stem cells, pericytes, and fibroblast cells provided on principal faces thereof.

In example 2, a blood vessel model with a cell layer affixed thereto was produced by taking the blood vessel model of example 1 and forming a layer of rat vascular endothelial cells on the upper face of the porous membrane and forming a layer of cells composed of rat smooth muscle cells on the lower face of the porous membrane.

In comparative example 2, a blood vessel model with a cell layer affixed thereto was produced by taking the blood vessel model of comparative example 1 and forming a layer of rat vascular endothelial cells on the upper face of the porous membrane and forming a layer of cells composed of rat smooth muscle cells on the lower face of the porous membrane.

In example 2 and comparative example 2, Rat Arterial Endothelial Cells produced by Angio-Proteomie were employed for the rat vascular endothelial cells, and Rat Aortic Smooth Muscle Cells produced by Lonza were employed for the rat smooth muscle cells. The lower microchannel was initially seeded with 100 μL of a cell suspension of rat smooth muscle cells having a cell concentration of $3 \times 10^6$ cells/ml. After a day of cultivation, the upper microchannel was seeded with 100 μL of a cell suspension of rat vascular endothelial cells having a cell concentration of $3 \times 10^6$ cells/ml. After two days of cultivation, the cell-layer-affixed blood vessel models of example 2 and comparative example 2 were obtained.

A blood dilution with a red blood cell count of $3.7 \times 10^5$ cells/ml was run through the upper microchannels of the blood vessel models produced in example 1 and comparative example 1, and a physiological saline solution was run through the lower microchannels thereof. The rate of fluid delivery of the blood dilution and the physiological saline solution was set to 500 μL/min, the internal pressure of the upper microchannel was set to approximately 8.7 kPa, and the internal pressure of the lower microchannel was set to approximately 1.3 kPa so as to establish parameters close to the blood flow and blood pressure conditions inside actual blood vessels.

Counts of the number of red blood cells inside the lower microchannel, namely, inside the physiological saline solution, after a certain amount of time had elapsed since starting fluid delivery gave a number of red blood cells of $9.2 \times 10^4$ cells/ml in example 1, and a number of red blood cells of $2.2 \times 10^4$ cells/ml in the blood vessel model of comparative example 1.

This test was able to confirm that the porous membranes of example 1 and comparative example 1 both had permeability to red blood cells under conditions equivalent to those of blood pressure. Further, in comparison to the porous membrane of comparative example 1, the porous membrane of example 1 was more readily permeable to red blood cells, enabling confirmation that the porous membrane of the present exemplary embodiment enables the movement of red blood cells to be suppressed from being obstructed.

A culture medium dilution containing fluorescent beads at a concentration of $1.81 \times 10^6$ beads/ml for a tracer was run through the upper microchannel of the cell-layer-affixed blood vessel models produced in example 2 and comparative example 2, and a culture medium not containing fluorescent beads was run through the lower microchannel. The fluorescent beads had a diameter of 4 μm and were labeled with red fluorescent dye with an excitation wavelength of 580 nm and a fluorescence wavelength of 605 nm. The rate of fluid delivery of the culture medium dilution containing fluorescent beads and the culture medium not containing fluorescent beads was set to 500 μL/min, the internal pressure of the upper microchannel was set to approximately 8.7 kPa, and the internal pressure of the lower microchannel was set to approximately 1.3 kPa so as to establish parameters close to the blood flow and blood pressure conditions inside actual blood vessels.

Counts of the number of fluorescent beads inside the lower microchannel, namely, inside the culture medium, after a certain amount of time had elapsed since starting fluid delivery gave a number of fluorescent beads of $6.5 \times 10^4$ beads/ml in example 2, and a number of fluorescent beads of $9.2 \times 10^3$ beads/ml in comparative example 2. A physiological saline dilution containing fluorescent beads at $1.81 \times 10^6$ beads/ml was run through the upper microchannel of the blood vessel models produced in example 1 and comparative example 1, and physiological saline was run through the lower microchannel. The rate of fluid delivery was set to 500 µL/min. Counts of the number of fluorescent beads inside the lower microchannel gave a number of fluorescent beads of $1.7 \times 10^5$ beads/ml in example 1, and a number of fluorescent beads of $4.3 \times 10^4$ beads/ml in comparative example 1. This test was able to confirm that forming a cell layer on both faces of the porous membrane reduces the permeability of the porous membrane to fluorescent beads, and endows the porous membrane with barrier properties.

The cell layers on both faces of the porous membrane of the cell-layer-affixed blood vessel models produced in example 2 and comparative example 2 were exposed to a drug by running cytochalasin, this being the drug, through each of the upper microchannel and the lower microchannel at a concentration of 50 µg/ml and at a flow rate of 0.7 µL/min for one day.

After drug exposure, a fluorescent bead permeability test was performed using the same method as the fluorescent bead permeability test for the cell-layer-affixed blood vessel models described above. Counts of the number of fluorescent beads inside the lower microchannel, namely, inside the culture medium, after a certain amount of time had elapsed since starting fluid delivery gave a number of fluorescent beads of $1.7 \times 10^5$ beads/ml in example 2, and a number of fluorescent beads of $6.7 \times 10^3$ beads/ml in comparative example 2.

This test was able to confirm that it was possible for fluorescent beads to permeate the porous membranes in the cell-layer-affixed blood vessel models of both example 2 and comparative example 2 after cell layers have been injured by a drug. Further, in comparison to the porous membrane of comparative example 2, the porous membrane of example 2 was more permeable to fluorescent beads, enabling confirmation that the porous membrane of the present exemplary embodiment enables the movement of fluorescent beads to be suppressed from being obstructed. It was thus confirmed that the porous membrane of the present exemplary embodiment enables evaluation of drug toxicity in a blood vessel model with high sensitivity.

In example 3, similarly to in example 2, a cell-layer-affixed blood vessel model was produced with a layer of rat vascular endothelial cells formed on the upper face of the porous membrane and a layer of rat smooth muscle cells formed on the lower face of the porous membrane.

In comparative example 3, similarly to in comparative example 2, a cell-layer-affixed blood vessel model was produced with a layer of rat vascular endothelial cells formed on the upper face of the porous membrane and a layer of rat smooth muscle cells formed on the lower face of the porous membrane.

The cells employed in example 3 and comparative example 3 were the same as that employed in example 2 and comparative example 2. To form the cell layers, the lower microchannel was initially seeded with 100 µL of a cell suspension of rat smooth muscle cells having a cell concentration of $3 \times 10^6$ cells/ml. After a day of cultivation, the upper microchannel was seeded with 100 µL of a cell suspension of rat vascular endothelial cells having a cell concentration of $1 \times 10^6$ cells/ml and cultivated for six hours.

Then, a respective culture medium (rat EC medium/SMC medium) was run through each channel with a rate of fluid delivery of 0.7 µL/min using a pump. After two days of cultivation, the cell-layer-affixed blood vessel models of example 3 and comparative example 3 were obtained.

The lower microchannels of the cell-layer-affixed blood vessel models produced in example 3 and comparative example 3 were closed off, and a culture medium dilution containing FITC-Dextran (46945, produced by Sigma-Aldrich) at a concentration of 12.5 µg/50 µl for a tracer was run through the upper microchannels. The rate of fluid delivery of the culture medium dilution containing FITC-Dextran was set to 7 µL/min.

Figure 8A:
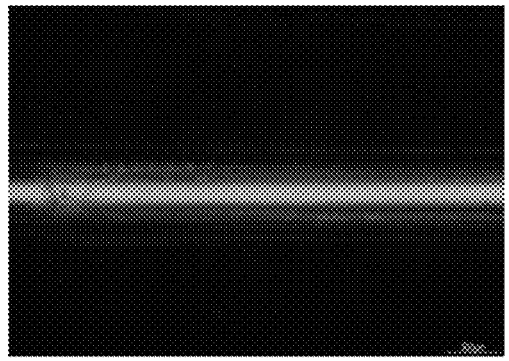
FIG. 8A is a result of image fluorescence in the microchannels of the cell-layer-affixed blood vessel models of an example 3.
Figure 8A:
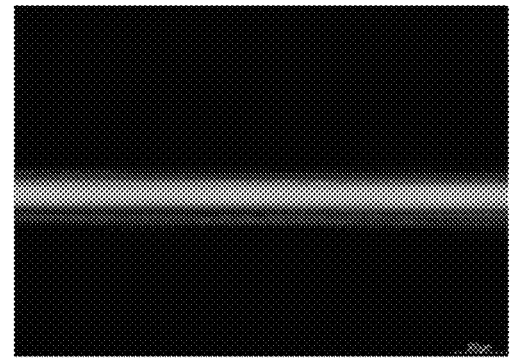
Figure 8B:
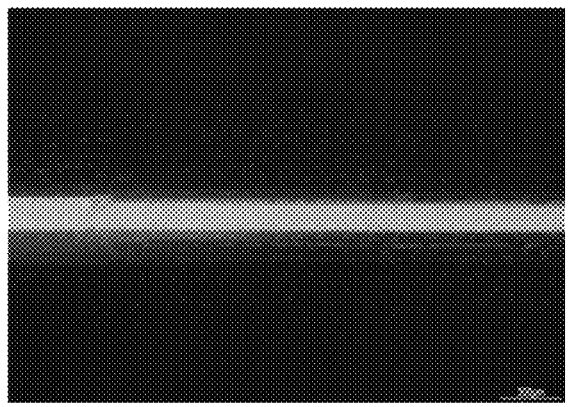
FIG. 8B is a result of image fluorescence in the microchannels of the cell-layer-affixed blood vessel models of a comparative example 3.
Figure 8B:
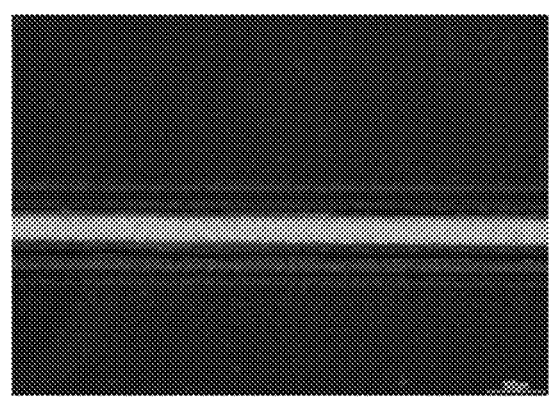

Two minutes after running the FITC-Dextran through the channels, an inverted microscope (product name Eclipse Ts2, made by Nikon) was used to image fluorescence in the microchannels. For the imaging parameters, a magnification of 4 times, a gain of 1600, and an exposure time of 60 ms were employed. These results are illustrated in FIG. 8A and FIG. 8B. In both example 3 and comparative example 3, no fluorescence was observed in the lower channel. This indicates that the FITC-Dextran did not permeate from the upper channels to the lower channels. This test was able to confirm that forming a cell layer on both faces of the porous membrane inhibits FITC-Dextran permeation, and endows the porous membrane with barrier properties.

The vascular endothelial cell layer of the porous membrane of the cell-layer-affixed blood vessel models produced in example 3 and comparative example 3 was exposed to a drug by running fenoldopam, this being the drug, through the upper microchannel at a concentration of 500 ng/ml and at flow rate of 0.7 µL/min for one day.

Figure 9A:
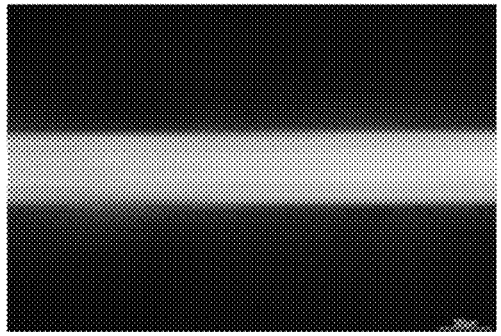
FIG. 9A is a result of a FITC-Dextran permeability test in the cell-layer-affixed blood vessel models of an example 3.
Figure 9A:
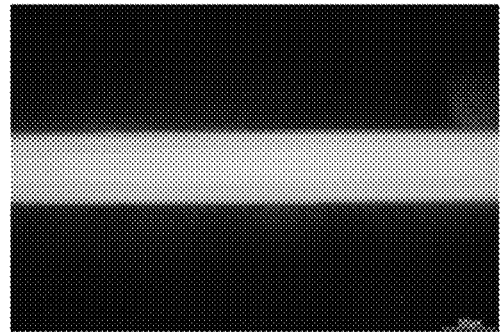
Figure 9B:
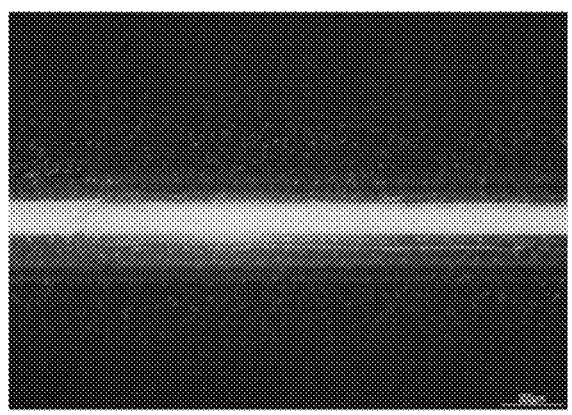
FIG. 9B is a result of a FITC-Dextran permeability test in the cell-layer-affixed blood vessel models of a comparative example 3.
Figure 9B:
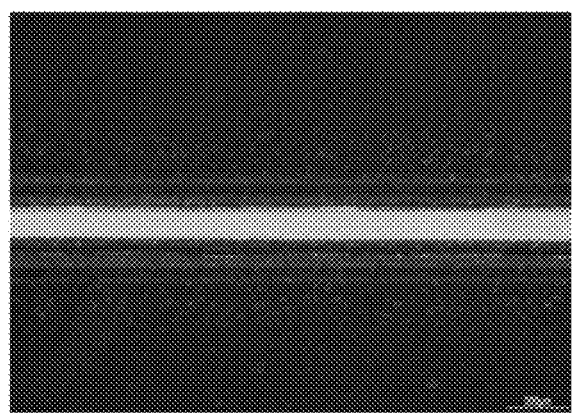

After drug exposure, a FITC-Dextran permeability test was performed using the same method as the FITC-Dextran permeability test for the cell-layer-affixed blood vessel models described above. These results are illustrated in FIG. 9A and FIG. 9B. In the cell-layer-affixed blood vessel model of example 3, in addition to in the upper microchannel, fluorescence was observed over a wide area, including in the lower microchannel. In the cell-layer-affixed blood vessel model of comparative example 3, the fluorescence observed in the lower microchannel was minimal. This test was able to confirm that it was possible for FITC-Dextran to permeate the porous membranes in the cell-layer-affixed blood vessel models of both example 3 and comparative example 3 after cell layers have been injured by a drug. Further, the porous membrane of example 3 was more permeable to FITC-Dextran than the porous membrane of comparative example 3, enabling confirmation that the porous membrane of the present exemplary embodiment does not impede the movement of FITC-Dextran. It was thus confirmed that the porous membrane of the present exemplary embodiment enables evaluation of drug toxicity in a blood vessel model with high sensitivity.

Figure 10A:
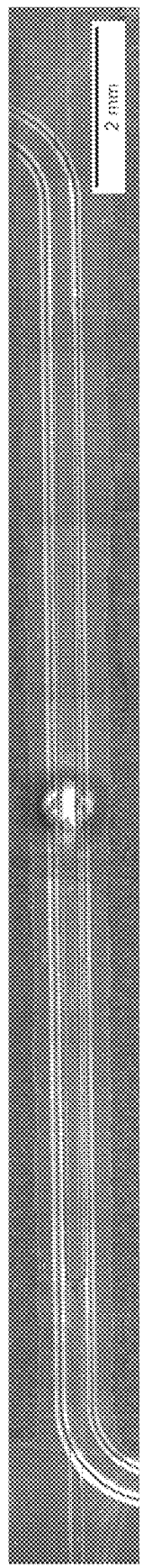
FIG. 10A is a micrograph of the porous membrane of an example 4.
Figure 10B:
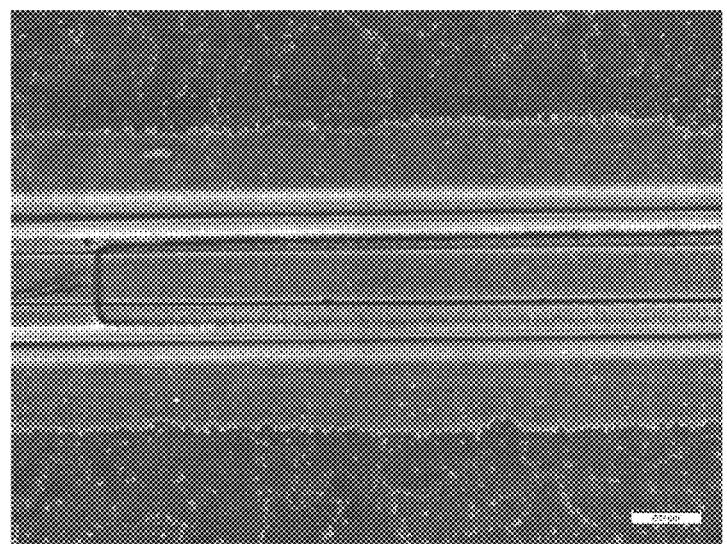
FIG. 10B is a partial enlarged view of FIG. 10A.

In example 4, a blood vessel model was produced by providing 12 mm×0.2 mm openings at straight portions of the upper and lower channels of the blood vessel model of example 1. The openings were formed by inserting a polypropylene reinforcing member, formed with a 0.2 mm wide slit, between the lower channel member and the porous membrane. The reinforcing member had a thickness of 100 µm. FIG. 10A and FIG. 10B illustrates a micrograph of the porous membrane of example 4.

Figure 11:
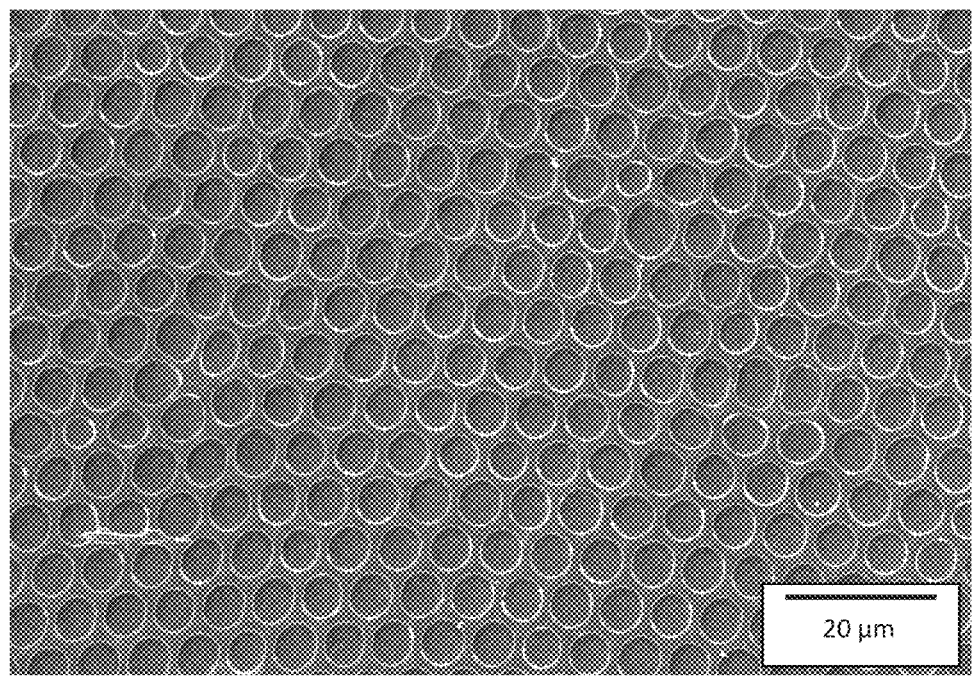
FIG. 11 is a micrograph of the porous membrane of an example 5.

In example 5, a cell-layer-affixed blood vessel model was produced by spraying collagen (5005-100ML, produced by Advanced BioMatrix) on the porous membrane of the blood vessel model of example 1 for 15 minutes at 60° C., and then allowing the collagen to dry so as to form a thick coating, and then forming a layer of rat vascular endothelial cells on the upper face of the porous membrane and forming a layer of rat smooth muscle cells on the lower face of the porous membrane. FIG. 11 illustrates a micrograph of the porous membrane of example 5.

In example 6, a blood vessel model with a single cell layer affixed thereto was produced by taking the blood vessel model of example 4 and forming a layer of rat vascular endothelial cells on the upper face of the porous membrane.

A culture medium dilution containing fluorescent beads at a concentration of $1.81 \times 10^6$ beads/ml for a tracer was run through the upper microchannel of the single-cell-layer-affixed blood vessel model produced in example 6, and a culture medium not containing fluorescent beads was run through the lower microchannel thereof. The fluorescent beads had a diameter of 4 µm and were labeled with red fluorescent dye with an excitation wavelength of 580 nm and a fluorescence wavelength of 605 nm. The rate of fluid delivery of the culture medium dilution containing fluorescent beads and the culture medium not containing fluorescent beads was set to 500 µL/min, the internal pressure of the upper microchannel was set to approximately 8.7 kPa, and the internal pressure of the lower microchannel was set to approximately 1.3 kPa so as to establish parameters close to the blood flow and blood pressure conditions inside actual blood vessels.

Counts of the number of fluorescent beads inside the lower microchannel, namely, inside the culture medium, after a certain amount of time had elapsed since starting fluid delivery gave a number of fluorescent beads of $2.67 \times 10^4$ beads/ml in example 6. Running a physiological saline dilution containing fluorescent beads at $1.81 \times 10^6$ beads/ml through the upper channel of the blood vessel model of example 4 and running physiological saline through the lower channel thereof at a rate of fluid delivery of 500 µL/min gave a number of fluorescent beads of $7.23 \times 10^5$ beads/ml in example 4. This test was able to confirm that forming a cell layer on a single face of the porous membrane reduces the permeability of the porous membrane to fluorescent beads, and endows the porous membrane with barrier properties.

In example 7, a cell-layer-affixed blood vessel model was produced by taking the blood vessel model of example 1 and forming a layer of human vascular endothelial cells derived from induced pluripotent stem cells on the upper face of the porous membrane and forming human mesenchymal stem cells on the lower face of the porous membrane.

In example 8, a porous membrane formed of polycarbonate, similar to the porous membrane 28 of the above exemplary embodiment, was employed in which the openings of plural through-holes were arranged in a honeycomb pattern and the through-holes were in communication through communication holes. Note that the average opening diameter of openings in the porous membrane of example 8 was 3 µm, the opening coverage ratio of the openings was 52%, the membrane thickness of the porous membrane was 1.2 µm, the variation coefficient of the opening diameters of the openings was 5.0%, and the porosity of the porous membrane was 80%.

In example 9, a cell-layer-affixed blood vessel model was produced by taking the blood vessel model of example 8 and forming rat vascular endothelial cells on the upper face of the porous membrane and forming rat smooth muscle cells the lower face of the porous membrane.

What is claimed is:

1. A blood vessel model comprising:
   a pair of channel members, mutually opposing each other, each of which includes an opposing face in which a respective microchannel is formed; and
   a porous membrane that includes a plurality of through-holes penetrating in a thickness direction, that is disposed between the opposing faces of the pair of channel members, and that partitions between the microchannels,
   wherein the porous membrane is provided with a vascular endothelial cell layer so as to cover one face facing one of the microchannels, an average opening diameter of the through-holes is from 1 µm to 20 µm, and an opening coverage ratio of the through-holes is from 30% to 70%, and
   wherein the porous membrane includes communication holes formed inside the porous membrane, the communication holes placing, among the plurality of through-holes, through-holes that are adjacent to each other in communication with each other within the porous membrane.

2. The blood vessel model of claim 1, wherein a membrane thickness of the porous membrane is less than or equal to half of the average opening diameter of the through-holes.

3. The blood vessel model of claim 1, wherein:
   the through-holes are arranged in a honeycomb pattern;
   a variation coefficient of opening diameters of the through-holes is less than or equal to 10%; and
   a porosity of the porous membrane is greater than or equal to 50%.

4. The blood vessel model of claim 1, further comprising a cell layer of cells selected from the group consisting of smooth muscle cells, mesenchymal stem cells, pericytes, and fibroblast cells, provided at the other face of the porous membrane facing the other microchannel.

5. The blood vessel model of claim 1, wherein:
   a tensile elongation at break of the porous membrane is greater than or equal to 50%; and
   a stress required for 10% elongation of the porous membrane is less than or equal to 1000 gf/mm$^2$.

6. The blood vessel model of claim 1, wherein the through-holes have flattened shapes in plan view including a major axis and a minor axis.

7. The blood vessel model of claim 1, wherein the porous membrane includes a porous region in which the through-holes are formed, and a non-porous region in which the through-holes are not formed.

8. A method for executing an extravasation test using a blood dilution containing a drug, the method comprising:
   providing the blood vessel model of claim 1;
   running the blood dilution containing the drug in a microchannel that faces the face of the porous membrane to which the vascular endothelial cell layer is provided; and
   counting a number of red blood cells that leak out into a microchannel that faces the other face of the porous membrane.

* * * * *